(12) United States Patent
Cui et al.

(10) Patent No.: US 8,573,949 B2
(45) Date of Patent: Nov. 5, 2013

(54) METHOD AND SYSTEM FOR FOCUSED ENERGY BRAZING

(75) Inventors: Yan Cui, Greenville, SC (US); Srikanth Chandrudu Kottilingam, Simpsonville, SC (US); Gene Murphy, Pelzer, SC (US)

(73) Assignee: General Electric Company, Schenectady, NY (US)

( * ) Notice: Subject to any disclaimer, the term of this patent is extended or adjusted under 35 U.S.C. 154(b) by 1285 days.

(21) Appl. No.: 12/571,358

(22) Filed: Sep. 30, 2009

(65) Prior Publication Data
US 2011/0076151 A1 Mar. 31, 2011

(51) Int. Cl.
*F01D 5/14* (2006.01)

(52) U.S. Cl.
USPC ..... 416/241 R; 415/200; 416/97 R; 416/96 R

(58) Field of Classification Search
USPC ........... 415/115, 200; 416/97 R, 96 R, 241 R; 219/121.61, 121.63, 121.64
See application file for complete search history.

(56) References Cited

U.S. PATENT DOCUMENTS

| | | | | |
|---|---|---|---|---|
| 3,182,175 A | * | 5/1965 | Sibley | 219/121.27 |
| 4,160,150 A | * | 7/1979 | Konig | 219/121.14 |
| 5,407,119 A | * | 4/1995 | Churchill et al. | 228/124.5 |
| 5,483,036 A | * | 1/1996 | Giedt et al. | 219/121.14 |
| 5,986,233 A | * | 11/1999 | Antieau et al. | 219/121.13 |
| 6,827,254 B2 | * | 12/2004 | Hasz et al. | 228/246 |
| 7,058,552 B2 | | 6/2006 | Stothert et al. | |
| 8,087,565 B2 | * | 1/2012 | Kottilingam et al. | 228/119 |
| 2004/0103068 A1 | | 5/2004 | Eker et al. | |
| 2005/0196277 A1 | | 9/2005 | Wang et al. | |
| 2005/0209713 A1 | | 9/2005 | Fuller | |
| 2006/0102597 A1 | * | 5/2006 | Brown et al. | 219/121.14 |
| 2006/0285974 A1 | | 12/2006 | Bunker et al. | |
| 2007/0154338 A1 | * | 7/2007 | Sathian et al. | 419/5 |
| 2008/0237306 A1 | | 10/2008 | Sathian | |
| 2008/0317597 A1 | | 12/2008 | Veltre et al. | |

OTHER PUBLICATIONS

U.S. Appl. No. 12/206,033, filed Sep. 8, 2008, Kottilingam, Srikanth Chandrudu.

* cited by examiner

*Primary Examiner* — Ninh H Nguyen
(74) *Attorney, Agent, or Firm* — Fletcher Yoder P.C.

(57) ABSTRACT

A method and system that includes generation of an energy beam. The energy beam may be generated from a focused energy source. Additionally, the energy beam may be directed towards a pre-sintered preform. The pre-sintered preform may be made of a braze material and may seal a hole that may be located in a turbine component.

20 Claims, 6 Drawing Sheets

METHOD AND SYSTEM FOR FOCUSED ENERGY BRAZING

BACKGROUND OF THE INVENTION

The subject matter disclosed herein relates to the use of focused energy to aid in the closure of apertures.

Components of gas turbines, such as buckets (buckets), nozzles (vanes), and other hot gas path components, are typically formed of nickel, cobalt or iron-base superalloys with desirable mechanical properties for turbine operating temperatures and conditions. Because the efficiency of a gas turbine is dependent on its operating temperatures, there is a demand for components, and particularly turbine buckets and nozzles, which are capable of withstanding increasingly higher temperatures. As the maximum local metal temperature of a superalloy component approaches the melting temperature of the superalloy, forced air cooling becomes necessary. For this reason, airfoils of gas turbine buckets and nozzles often require complex cooling schemes in which air is forced through internal cooling passages within the airfoil and then discharged through cooling holes at the airfoil surface.

Buckets and nozzles formed by casting processes require cores to define the internal cooling passages. During the casting process, shifting of the cores is prevented by supporting the cores within the mold using quartz rods or similar means. The rods create openings (through-holes) in the casting that must be securely closed or plugged to prevent the loss of cooling air through these holes and ensure proper air flow levels through the intended cooling holes of the casting. Accordingly, improved methods and systems for ensuring the closure of these holes may be desirable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a focused energy source configured to generate an energy beam, and a controller configured to control at least one performance characteristic of the focused energy source to adjust the energy beam for focused brazing of a pre-sintered preform.

In a second embodiment, a system includes a turbine component comprising a superalloy, and a pre-sintered preform (PSP) braze material disposed on a portion of the turbine component.

In a third embodiment, a method includes generating an energy beam from a focused energy source and directing the energy beam toward a pre-sintered preform of a braze material to seal a hole in a turbine component.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a system and a method for closing holes in buckets and nozzles generated during their casting. The system and method may include localized heating of the buckets and/or nozzles. This localized heating may be accomplished via a focused energy source impacting pre-sintered preforms (PSPs), e.g., made of a brazing material, that have been machined to completely cover the casting holes of the bucket and/or nozzles. The localized heating may include electron beam brazing techniques that allow for a controlled temperature increase of the materials to be brazed, as well as controlled movement of the energy beam utilized to braze the pre-sintered preform and the bucket and/or nozzle. In one embodiment, a controller may be utilized in to control the brazing process.

Figure 1:
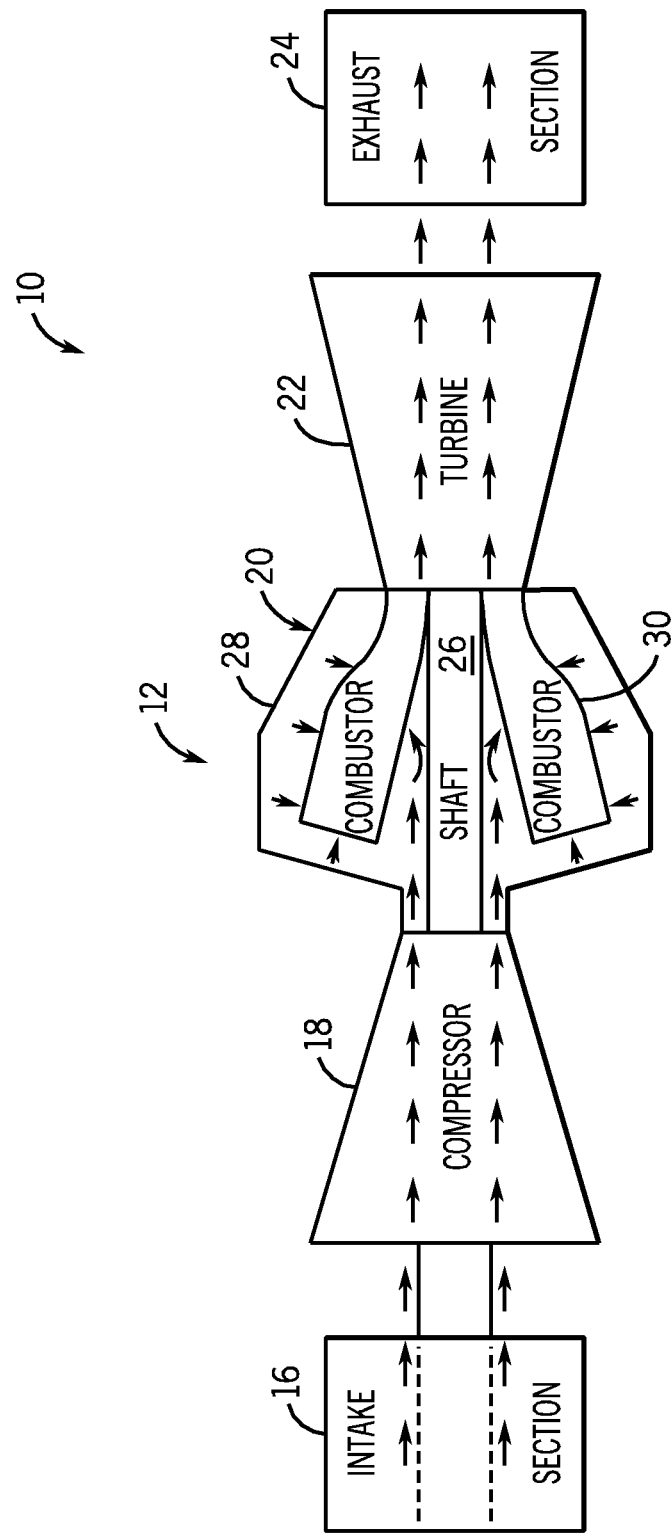
FIG. 1 is a schematic flow diagram of an embodiment of a gas turbine engine that may employ turbine bucket platforms.

FIG. 1 is a block diagram of an exemplary system 10 including a gas turbine engine 12 that may employ platforms designed to interface at or near the turbine rotor buckets (i.e. blades). In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is drivingly coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the combustors 30 to drive the turbine 22.

From the combustor section 20, the hot combustion gases flow through the turbine 22, driving the compressor 18 via the shaft 26. For example, the combustion gases may apply motive forces to turbine rotor buckets within the turbine 22 to rotate the shaft 26. After flowing through the turbine 22, the hot combustion gases may exit the gas turbine engine 12 through the exhaust section 24.

Figure 2:
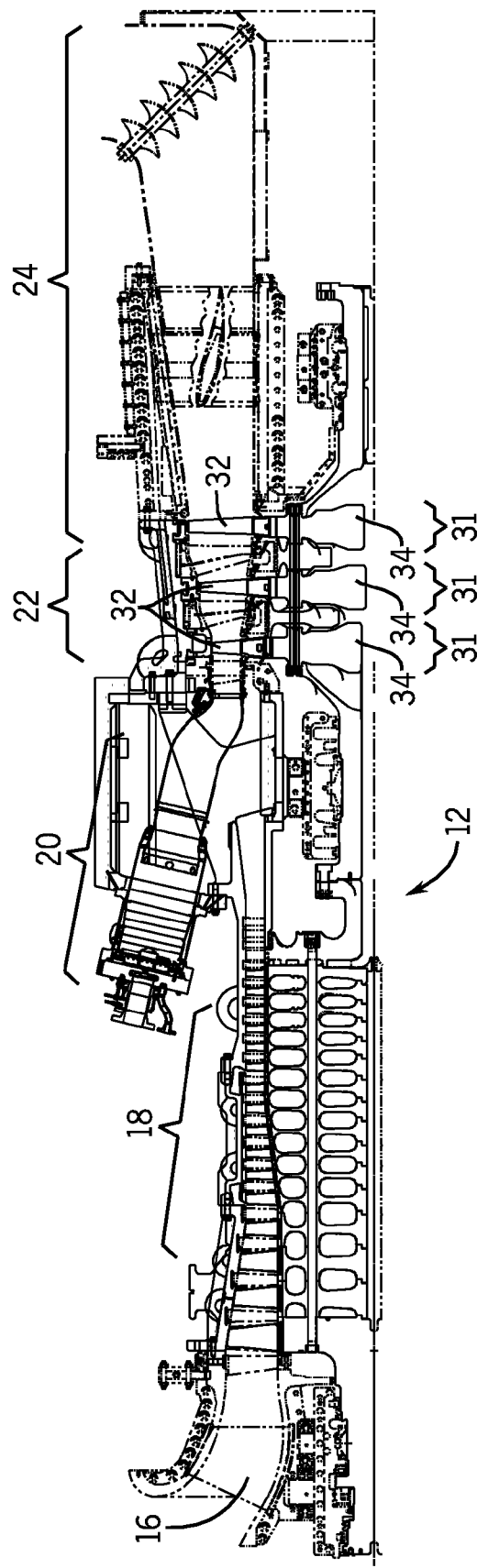
FIG. 2 is a sectional view of the gas turbine engine of FIG. 1 sectioned through the longitudinal axis.

FIG. 2 is a side view of an embodiment of the gas turbine engine 12 of FIG. 1 taken along the longitudinal axis. As depicted, the gas turbine 22 includes three separate turbine rotors 31. Each rotor 31 includes a rotor assembly 32 coupled to a rotor wheel 34 that may be rotatably attached to the shaft 26 (FIG. 1). The rotor assemblies 32 may include buckets that extend radially outward from the rotor wheels 34 and may be partially disposed within the path of the hot combustion gases. As discussed further below, the rotor assemblies 32 may include the turbine buckets and the turbine bucket platforms. Although the gas turbine 22 is illustrated as a three-stage turbine with three rotors 31, the turbine bucket platforms described herein may be employed in any suitable type of turbine with any number of stages and shafts. For example, the platforms may be included in a single stage gas turbine, in a dual turbine system that includes a low-pressure turbine and a high-pressure turbine, or in a steam turbine.

As described above with respect to FIG. 1, air may enter through the air intake section 16 and be compressed by the compressor 18. The compressed air from the compressor 18 may then be directed into the combustor section 20 where the compressed air may be mixed with fuel gas. The mixture of compressed air and fuel gas is generally burned within the combustor section 20 to generate high-temperature, high-pressure combustion gases, which may be used to generate torque within the turbine 22. Specifically, the combustion gases may apply motive forces to the rotor assemblies 32 to turn the wheels 34, thereby subjecting the rotor assemblies 32 to various mechanical loads and/or stresses. For example, the combustion gases may exert motive forces on the turbine buckets within the rotor assemblies 32.

Figure 3:
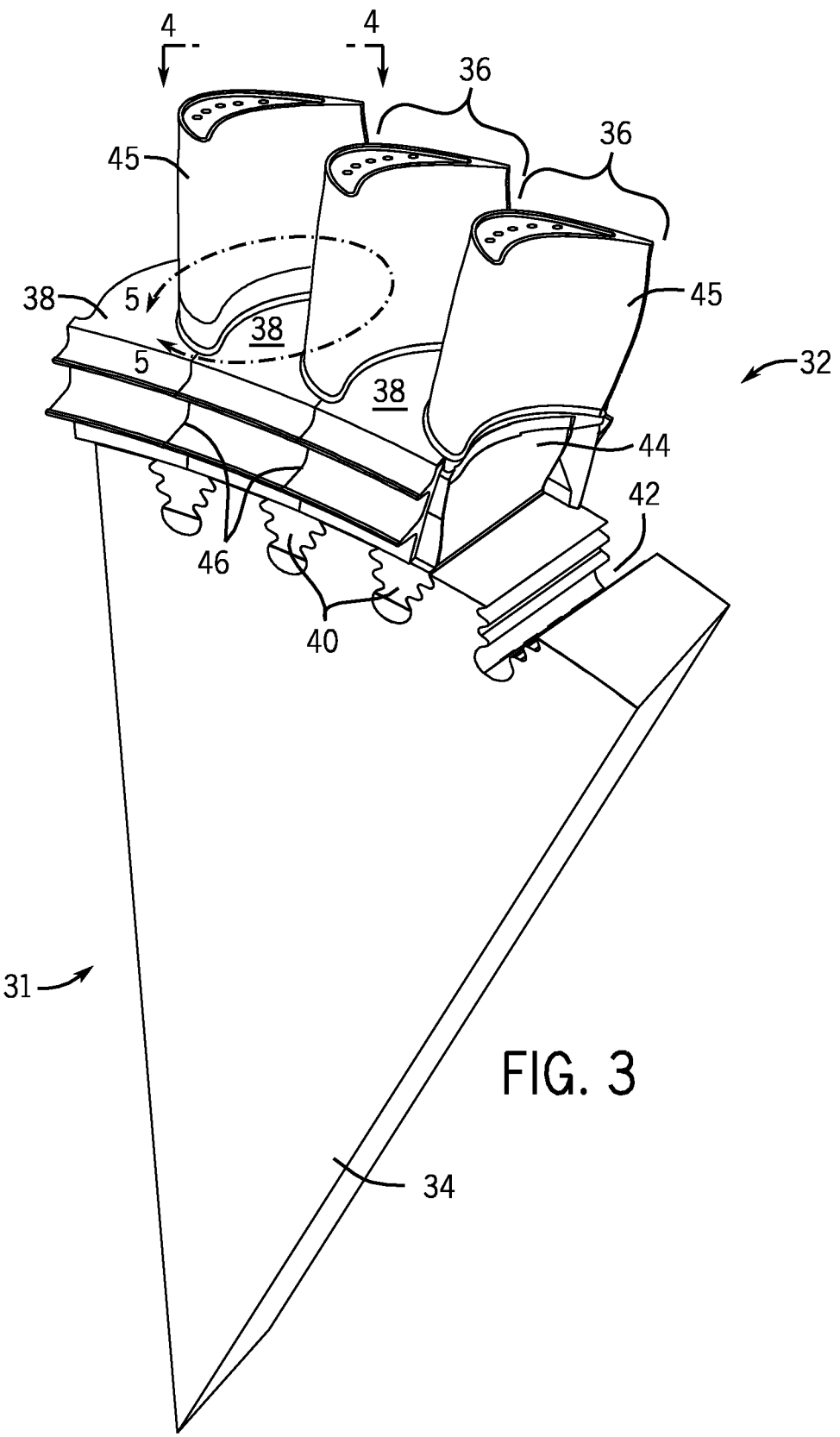
FIG. 3 is perspective view of an embodiment of the rotor wheels shown in FIG. 2.

FIG. 3 is a perspective view of a portion of one of the rotor wheels 31 shown in FIG. 2. For illustrative purposes, only a portion of the rotor wheel 31 is illustrated. However, the wheel 31 may generally include a circular structure with rotor assemblies 32 extending radially outward along the circumference of the wheel. The rotor assemblies 32 include turbine buckets 36 and turbine bucket platforms 38 that may be collectively known as the rotor assemblies 32. In certain embodiments, approximately 60 to 92 rotor assemblies 32 may be mounted and spaced circumferentially around the wheel 34 and a corresponding axis of rotation.

The buckets 36 and platforms 38 of the rotor assemblies 32 may be constructed of a metal, metal alloy, CMC, or other suitable material. The buckets 36 may be cast from a high-temperature material, notable examples of which include nickel-based superalloys such as René N4, René N5, René 108, GTD-111®, GTD-222®, GTD-444® and IN-738, and cobalt-based superalloys such as FSX-414. René N4, René N5, René 108, GTD-111®, GTD-222®, GTD-444® are gamma prime-strengthened nickel-based superalloys, while the nominal composition of FSX-414 is, by weight, about 29.5% chromium, 10.5% nickel, 7% tungsten, up to 2% iron, 0.25% carbon, and 0.012% boron, the balance cobalt and incidental impurities. The nominal composition of IN-738 is reported as, by weight, about 16% chromium, 8.5% cobalt, 1.75% molybdenum, 2.6% tungsten, 1.75% tantalum, 0.9% niobium, 3.4% aluminum, 3.4% titanium, 0.10% zirconium, 0.01% boron, 0.17% carbon, the balance nickel and impurities. These alloys are notable as they are susceptible to cracking when welded, though the invention is also applicable to other high temperature alloys.

Each bucket 36 includes a dovetail 40 that may be inserted into corresponding openings 42 within the rotor wheel 34. The openings 42 may be circumferentially spaced at angular positions around the rotor wheel 34. The bucket 36 also includes a shank 44 extending radially outward from the dovetail 40. In certain embodiments, the bucket 36 may include a contour, ledge, or other support structure, for supporting the platforms 38. For example, the contour may be located on the shank 44 or on an airfoil 45 extending radially outward from the shank 44. The airfoils 45 may be disposed within the path of the hot combustion gases. In operation, the hot combustion gases may exert motive forces on the airfoils 45 to drive the turbine 22 (FIG. 1).

The platforms 38 may be disposed generally between the shanks 44 of the buckets 36 and may be radially positioned between the openings 42 within the rotor wheel 34. The buckets 36 extend radially outward from the wheel 34 and are circumferentially spaced around the wheel 34 to create spaces between the buckets 36. The platforms 38 may be positioned in these circumferential spaces between the buckets 36. In other words, the platforms 38 are not merely integral extensions of the buckets 36, but rather the platforms 38 fill the spaces, or a portion of the spaces, separating the buckets 36 that extend at radial positions from the wheel 34. Further, the platforms 38 may be substantially disposed between the buckets 36 so the majority of each platform 38 is located between the same two adjacent buckets 36. For example, at least approximately 60, 70, 80, 90, or 100 percent, and all subranges therebetween, may be located between the same two adjacent buckets 36. The platforms 38 may extend between the shanks 44, the airfoils 45, the dovetails 40, or combinations thereof. In certain embodiments, the platforms 38 may be mounted and supported by contours located on the shanks 44. In other embodiments, the platforms 38 may be supported by the sides of the buckets 36. The platforms 38 also may include integral skirts or cover plates extending from the sides of the shanks.

The location of the interfaces 46 between the platforms 38 also may reduce stresses on the platforms 38. As noted above, the interfaces 46 are located at the angular positions of the buckets 36 rather than at the intermediate angular positions midway between the buckets 36. The platforms 38 are generally designed to create openings for the buckets 36 when joined together at an interface 46. Specifically, each side of the platform 38 may include an opening for a portion of the turbine bucket 36. When two platforms 38 are positioned adjacent to each other, the platforms 38 may form an opening corresponding to the profile of a turbine bucket 36. In other words, each platform 38 alone does not include an opening for encompassing the entire perimeter of a turbine bucket 36. Instead, each platform 38 has partial openings for a turbine bucket 36 that when interfaced with partial openings of an adjacent platform 38 form an opening that may encircle a turbine bucket 36. In this manner, the interfaces 46 between the platforms 38 are disposed adjacent to or near the turbine buckets 36. The location of the interfaces 46 on the turbine buckets 36 may reduce or eliminate leakage of combustion gases and/or cooling fluids between the shanks 44 of the buckets 36. In certain embodiments, the platforms 38 may be disposed against each other. However, in other embodiments, the platforms 38 may include attachment mechanisms such as connectors, tabs, seals, and the like for connecting one platform 38 to another.

In certain embodiments, the buckets 36 may have integral cooling passages to prevent hot corrosion and high temperature oxidation. These internal cooling passages may be formed via cores during the casting process to define the passages. For example, rods or other suitable means may prevent shifting of the cores during casting. However, removal of these rods may leave core print-out holes in the bucket 36. It may be desirable to securely close these print-out holes following the casting operation to prevent the loss of cooling air through the holes once the component bucket 36 is installed in a gas turbine engine 12. One example of these print-out holes is illustrated in FIG. 4.

Figure 4:
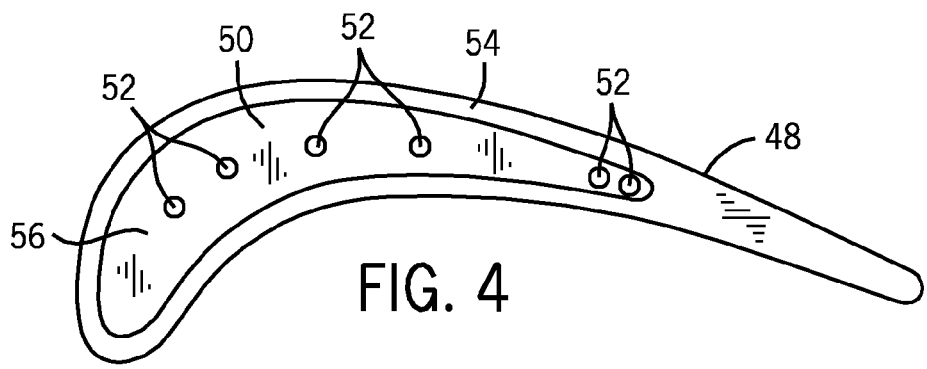
FIG. 4 is a top view of a bucket tip of the rotor wheel of FIG. 3.

FIG. 4 illustrates a top view of the uppermost portion of a bucket 36, the bucket tip 48. The bucket tip 48 may include a cavity 50 in which a plurality of print-out holes 52 may be dispersed. The cavity 50 may be set below the upper rim 54 at a distance of approximately 0.1 to 0.75 inches. Additionally, the print-out holes may be dispersed along a central portion 56 of the bucket tip 48. Each of the print-out holes 52 may have a diameter of approximately 0.060 to 0.125 inches and a depth of approximately 0.050 to 0.100 inches. As noted above, the print-out holes 52 may be directly coupled to cooling passages in the bucket 36. Accordingly, it may be advantageous to cover (close/seal) these holes prior to the bucket 36 being used in the gas turbine engine 12. In one embodiment, a first pre-sintered preform (PSP) material (e.g., braze material) with a first melting point may be disposed in one of the holes 52, while a second pre-sintered preform (PSP) material (e.g., braze material) with a second melting point may be disposed in a second one of the holes 52. As appreciated, the first and second melting points are different (e.g., lower temperature) than the melting point of the base material (e.g., the bucket 36). A focused energy beam may then braze the first pre-sintered preform material at a first temperature and subsequently the focused energy beam may braze the second pre-sintered preform material at a second temperature. In this manner, the first and second preform materials may be brazed independently. Additionally, other holes in may be present in the bucket 36 and may be covered as well with filling material and brazed prior to the use of the bucket 36.

Figure 5:
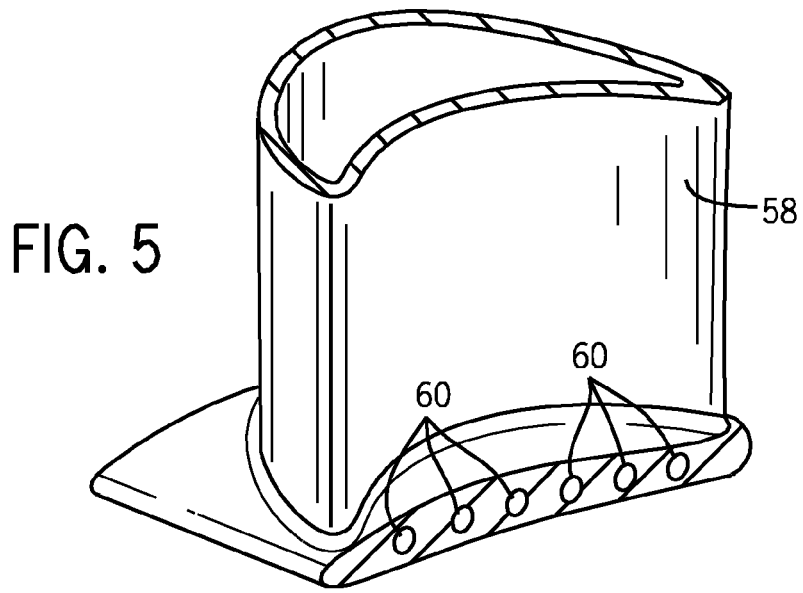
FIG. 5 is a perspective view of the bucket of the rotor wheel of FIG. 3.

FIG. 5 illustrates a bottom portion 58 of the bucket 36, which may include platform holes 60. These platform holes 60 may also be remnants from the casting process of the bucket or could be drilled holes to establish a cooling scheme. The platform holes 60 may be approximately 0.050 to 0.125 inches in diameter. Similar to the print-out holes 52, these platform holes 60 may be closed following the casting operation and prior to use of the bucket 36 so as to prevent the loss of cooling air through the platform holes 60. A system and process that may be utilized to close the platform holes 60 and/or the print-out holes 52 is shown in FIG. 6.

Figure 6:
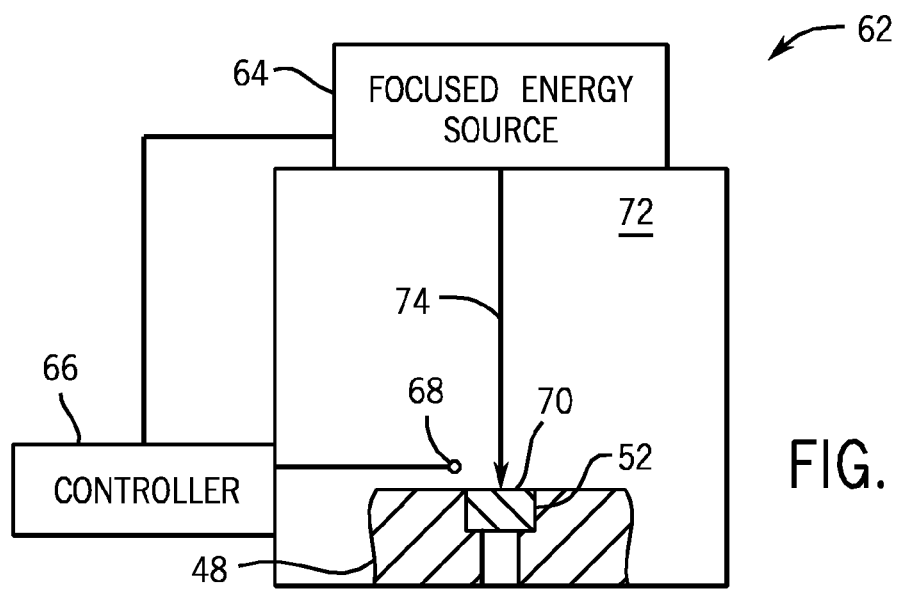
FIG. 6 is a schematic view of a first embodiment of a system for directing focused energy to a bucket of the rotor wheel of FIG. 3.

FIG. 6 illustrates a system for closing post-casting residual holes in the bucket 36. The system 62 may include a focused energy source 64, a controller 66, a sensor 68, and filling material 70. The focused energy source 64 may be, for example, an electron beam source, such as an electron beam welder, that produces a beam of high-velocity electrons. These electrons may be transmitted into, for example, a vacuum chamber 72 to prevent dispersion of the electron beam. The electrons in the beam may impact the filling material 70 and may melt the filling material 70 via transformation of the kinetic energy of the electrons into heat upon impact. This process may be termed electron beam brazing.

In another embodiment, the focused energy source 64 may be, for example, a laser source, such as a laser beam welder, that produces a laser beam of light. This laser beam may also be transmitted into, for example, a vacuum chamber 72 and may impact the filling material 70 to may melt the filling material 70. This process may be termed laser beam brazing.

The operation of the focused energy source may be controlled via a controller 66. The controller 66 may, for example, control the intensity (e.g. power) of an energy beam 74 for brazing of the filling material 70. The controller may also control the location and/or movement of the energy beam 74 across the filling material 70. For example, the controller 66 may cause the focused energy source 64 to move the energy beam 74 in a circular, figure eight, or other pattern across the surface of the filling material 70 to allow for even heating of the filling material 70.

In one embodiment, a sensor 68 may be coupled to the controller 66 for detecting characteristics such as ambient temperature, heat of the energy beam 74, movement of the energy beam 74, and/or other parameters relating to the brazing process. The sensor 68 may transmit detected parameters to the controller 66 for use by the controller 66 to adjust the operation of the focused energy source 64. For example, the sensor 68 may detect the temperature of air adjacent a region of the filling material 70 undergoing the brazing process. This temperature reading may be transmitted to the controller 66, where it may be analyzed to determine if the temperature reading by the sensor 68 corresponds to a desired temperature reading. This desired temperature reading may be, for example, initially stored in a memory in the controller 66 in the form of, for example, a look-up table or in other formats. If the temperature reading by the sensor 68 differs from the desired temperature reading, the controller 66 may transmit one or more control signals to the focused energy source 64 for adjustment of the intensity of the energy beam 74. In this manner, the controller 66 may operate as a control mechanism for the brazing process.

The filling material 70 may be a pre-sintered preform (PSP), that is, a mixture of particles that have been sintered together at a temperature below their melting points to form an agglomerate and somewhat porous mass. Suitable powder materials include particles formed of a base alloy having a composition similar to that of the alloy of the bucket 36 and/or the bucket tip 48, preferably a high strength superalloy, as well as particles of a second and different alloy powder that may also have a composition similar to that of the bucket 36 and/or the bucket tip 48, but further containing a melting point depressant such as boron or silicon to promote sintering of the filling material 70. This may aid in enabling bonding of the filling material 70 with, for example, the bucket tip 48 at temperatures below the melting point of the bucket tip 48.

Properties for the base alloy of the filling material 70 may include chemical and metallurgical compatibility with the alloy being brazed, fatigue strength, low tendency for cracking, oxidation resistance, and machinability. Particularly suitable base alloys also have a melting point of within about 25° C. of the melting temperature of the alloy being brazed, and a compositional range of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance nickel and incidental impurities. A composition for the base alloy is believed to be, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities.

Compositions for the second alloy of the filling material 70 may have a melting temperature below the melting temperature of the base alloy, and preferably about 25° C. to about 50° C. below the grain growth or incipient melting temperature of the material being brazed, for example, the bucket tip 48. An example of a suitable composition for the second alloy is, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities. Particular compositions for the second alloy particles 20 will depend on the compositions of the base alloy and the bucket 36 and/or bucket tip 48 being brazed.

Figure 7:
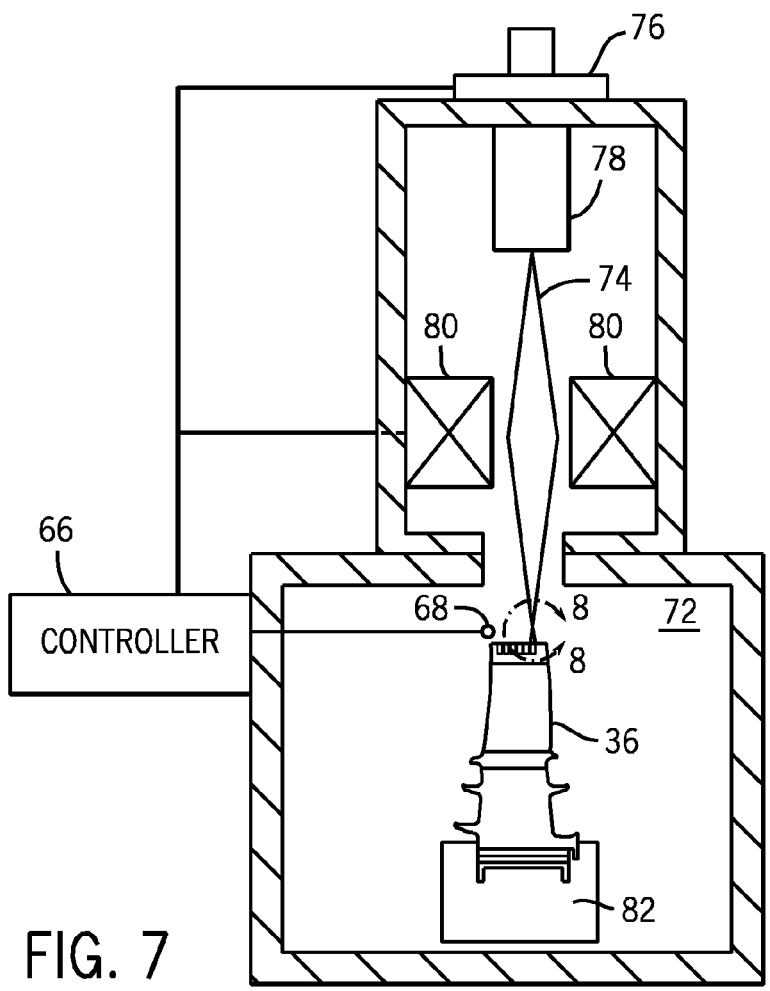
FIG. 7 is a schematic view of a second embodiment of a system for directing focused energy to a bucket of the rotor wheel of FIG. 3.

FIG. 7 illustrates a specific embodiment of a system for closing post-casting residual holes in a bucket 36 via electron beam brazing. The system includes a controller 66 and a sensor 68 that operate as described above with respect to FIG. 6. Additionally, the system includes an electron beam welder 76, an electron beam gun 78, one or more beam deflectors 80, and a fixture 82 (or platform) on which the bucket 36 sits. The electron beam welder 76 may be an electron beam generating device that is capable of receiving a high voltage and converting it into an energy beam 74 of electrons. The electron beam welder 76 may, for example, adjust the intensity and/or movement of the energy beam 74 issued from the electron beam gun 78. These adjustments may be determined by the controller 66 and received by the electron beam welder 76. Alternatively, in one embodiment, movement of the energy beam 74 may be accomplished via control of one or more beam deflectors 80.

The beam deflectors 80 may, for example, include beam deflection coils and/or other types of magnetic lenses. The beam deflectors 80 may generate a magnetic field proximate to the energy beam. The energy beam 74 may be either attracted to or may be repelled from the magnetic field. That is, the path of the energy beam 74 may be altered via the magnetic field. Furthermore, by varying the intensity of the magnetic field generated, the amount of movement the energy beam 74 (i.e., the path of the energy beam 74) may be adjusted. Accordingly, the beam deflectors 80 may be utilized to shift the energy beam 74, and as such, adjust the position at which the beam 74 strikes the bucket 36. In this manner, the beam 74 may be moved as desired in one or more patterns to allow for more even heat transfer from the beam 74 to the filling material 70. In one embodiment, the intensity of the magnetic field generated by the beam deflectors 80 may be adjusted via control signals from the electron beam welder 76. In another embodiment, the controller 66 may directly adjust the intensity of the magnetic field generated by the beam deflectors 80 via control signals transmitted to the beam deflectors 80.

The electron beam welder 76 may be used to locally heat a region of the bucket 36 and the filling material 70 (e.g., PSP) to a brazing temperature. That is, the energy beam 74 in a vacuum 72 may be used as a heat source to preform PSP brazing. This localized heating of the PSP filling material 70 to a brazing temperature may provide an advantage over traditional brazing processes, such as furnace brazing whereby the entire bucket 36 is heated to the brazing temperature, because furnace brazing may induce unwanted material changes to the bucket 36 when the entirety of the bucket 36 is exposed to high temperatures in a furnace.

In operation, the bucket 36 may be cleaned and machined PSP filling material 70 may be placed into each of the printout holes 52. The bucket 36 may be placed onto the fixture 82 and the region enclosing the bucket may be evacuated to form a vacuum. Once a vacuum is obtained, the energy beam 74 may be utilized to heat the filling material 70 and the bucket 36. Furthermore, to insure uniform heating, appropriate beam oscillation patterns such as circles or figure eight patters may be used to attain a gradual increase in temperature in the localized portion of the filling material 70 and the bucket 36 exposed to the beam 74. In one embodiment, the final brazing temperature of the localized portion of the filling material 70 and the bucket 36 may be between approximately 2000 and 2275 degrees Fahrenheit. After this braze temperature is attained, the beam 74 may contact the filling material 70 and the bucket 36 for approximately between one to five minutes to obtain braze flow. After the completion of this step, the beam 74 power may be reduced to achieve slow cooling of the materials exposed to the energy beam 74. In one embodiment, the temperature increase of the filling material 70 and the bucket 36 is between approximately 200 and 500 degrees Fahrenheit per minute. Thus, the energy beam 74 may contact the filling material 70 and the bucket 36 for approximately between five to ten minutes before reaching the brazing temperature. This gradual increase of the temperature may aid in controlling and generating a uniform braze.

Figure 8:
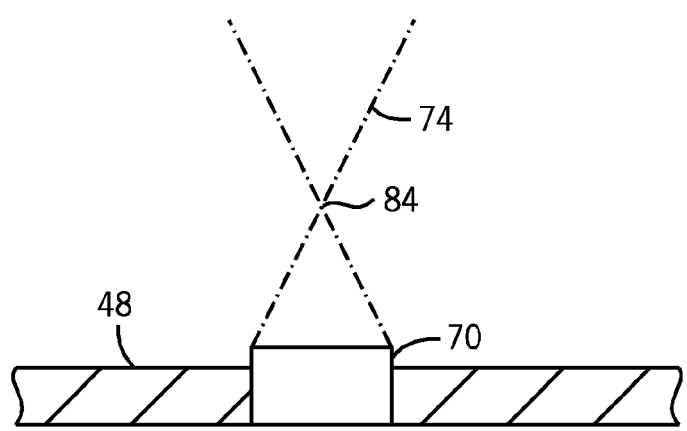
FIG. 8 is a side view of a first embodiment of a pre-sintered preform of the bucket tip of the rotor wheels shown in FIG. 7.

Additionally, to aid in the gradual increase of the temperature of the filling material 70 and the bucket 36, the energy beam 74 may be defocused. As illustrated in FIG. 8, the focal point 84 of the energy beam 74 may be above the surface of the filling material 70 and the bucket tip 48. In this manner, the energy imparted to the filling material 70 and the bucket tip 48 may be less than full strength (achieved at the focal point 84) to allow for a rate of temperature increase of approximately 200 and 500 degrees Fahrenheit per minute. The focal point 84 of the energy beam 74 may be, for example, approximately between 0.5 and 2 inches above or below the surface of the filling material 70. In another embodiment, the focal point 84 of the energy beam 74 may be located at approximately 1 inch above or below the surface of the filling material 70. Additionally, this focal point 84 may be adjusted via the beam deflectors 80 such that the area of the filling material 70 and/or the bucket tip 48 impacted by the beam 74 may be approximately between 0.05 and 0.25 inches in diameter. Accordingly, the deflection angle of the energy beam 74 may be approximately between 5 and 45 degrees and may be modified via adjustments to the intensity of the magnetic field generated by the beam deflectors 80.

Accordingly, a focused energy beam 74 may be utilized to braze a portion of a turbine component, such as a bucket 36 or a bucket tip 48. The energy beam 74 may be focused such that at least less than one percent, two percent, three percent, four percent of the surface area of, for example, the bucket tip 48 may be exposed to the energy beam 76. Additionally, less than a fractional percent of the surface area of, for example, the bucket tip 48 may be exposed to the energy beam 76. IN this manner, focused brazing may be accomplished.

Additionally, the print-out holes 52 to be filled by the PSP filling material 70 may be of various sizes and configurations. FIGS. 9-12 illustrate various manners in which to the PSP filling material 70 may be machined to generate filling material 70 that will occupy various sized and shaped print-out holes 52.

Figure 9:
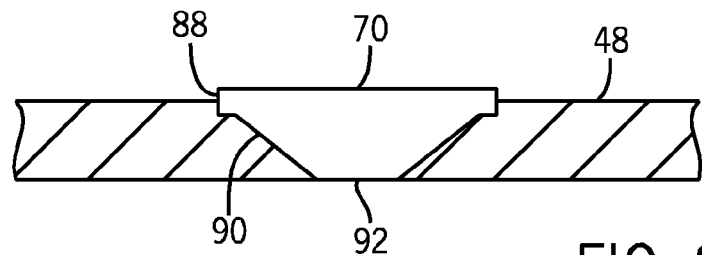
FIG. 9 is a side view of second embodiment of a pre-sintered preform for use with the system for directing focused energy to a bucket of the rotor wheel of FIG. 7.

FIG. 9 illustrates a PSP filling material 70 that is generally tapered in shape. The topmost portion 88 of the filling material 70 may be approximately 0.075 to 0.125 inches in diameter with sides 90 that taper from the topmost portion 88 at an angle of approximately between 5 and 30 degrees. The sides 90 may connect to the bottommost portion 92 of the filling material 70. The bottommost portion 92 of the filling material 70 may be approximately 0.050 to 0.075 inches in diameter. Thus, the filling material 70 of FIG. 9 may approximate a tapered cylinder shape.

Figure 10:
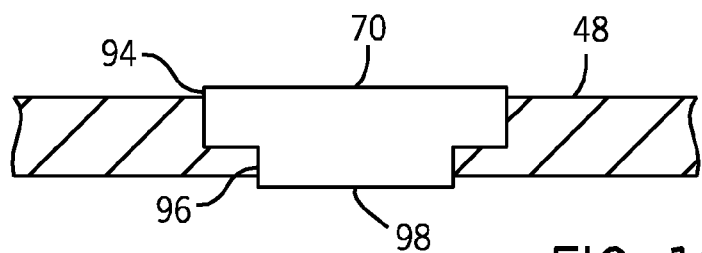
FIG. 10 is a side view of third embodiment of a pre-sintered preform for use with the system for directing focused energy to a bucket of the rotor wheel of FIG. 7.

FIG. 10 illustrates a PSP filling material 70 that is generally T-shaped cross-section. The topmost portion 94 of the filling material 70 may be approximately between 0.075 to 0.125 inches in diameter with sides 96 that contract from a diameter of approximately between 0.075 to 0.125 inches to a diameter of approximately between 0.050 to 0.075 inches at a depth of approximately between 0.025 to 0.075 inches. The sides 96 may connect to the bottommost portion 98 of the filling material 70, which may be approximately between 0.050 to 0.075 inches in diameter. Thus, the filling material 70 of FIG. 9 may approximate a T-shape cross-section.

Figure 11:
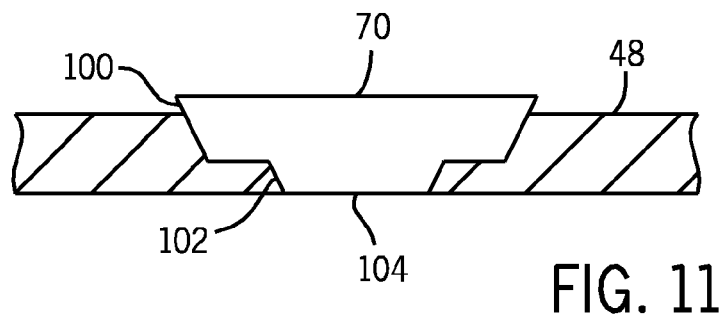
FIG. 11 is a side view of fourth embodiment of a pre-sintered preform for use with the system for directing focused energy to a bucket of the rotor wheel of FIG. 7.

FIG. 11 illustrates a PSP filling material 70 that is generally a tapered cylinder with a nail head shape. The filling material 70 may have a topmost portion of approximately between 0.075 to 0.125 inches in diameter with first sides 100 that taper from the topmost portion at an angle of approximately between 5 and 30 degrees to a depth of approximately between 0.010 to 0.050 inches. The sides 100 may contract to a diameter of approximately between 0.060 to 0.080 inches and may be coupled to sides 102, which also may taper at an angle of approximately between 5 and 30 degrees to the bottommost portion 104 of the filling material 70, which may be approximately between 0.050 to 0.075 inches in diameter. Thus, the filling material 70 of FIG. 9 may approximate a tapered cylinder with a nail head shape.

Figure 12:
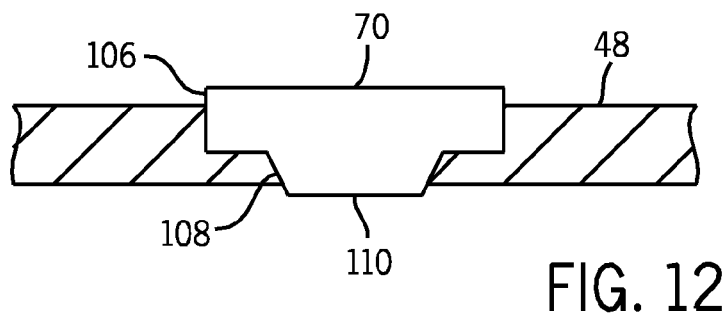
FIG. 12 is a side view of fifth embodiment of a pre-sintered preform for use with the system for directing focused energy to a bucket of the rotor wheel of FIG. 7.

FIG. 12 illustrates a PSP filling material 70 that is generally a modified T-shape. The filling material 70 may have a topmost portion of approximately between 0.075 to 0.125 inches in diameter with first sides 106 that contract from a diameter of approximately between 0.075 to 0.125 inches to a diameter of approximately between 0.060 to 0.080 inches at a depth of approximately between 0.010 to 0.050 inches. Coupled to the sides 106 at the contraction point are sides 108 that may taper at an angle of approximately between 5 and 30 degrees to the bottommost portion 110 of the filling material 70, which may be approximately 0.050 to 0.075 inches in diameter. Thus, the filling material 70 of FIG. 9 may approximate a modified T-shape.

It may be understood that the machined pre-forms of the filling material 70 illustrated in FIGS. 9-12 may be merely examples of the forms the filling material may take. Accordingly, it is envisioned that the filling material 70 may be machined to cover and fill any shaped print-out holes 52.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a focused energy source configured to generate an energy beam; and
   a brazing controller configured to control brazing of a pre-sintered preform via alteration of at least one performance characteristic of the focused energy source to adjust the energy beam for focused brazing of the pre-sintered preform.

2. The system of claim 1, wherein the focused energy source comprises an electron beam welder configured to generate the energy beam as an electron energy beam.

3. The system of claim 2, comprising a beam deflector, wherein the controller is configured to control the beam deflector to adjust a path of the energy beam.

4. The system of claim 3, wherein the controller is configured to control the beam deflector to adjust a focal point of the energy beam.

5. The system of claim 4, wherein the focal point is adjusted to be located at approximately 0.1 to 2 inches above the pre-sintered preform.

6. The system of claim 1, wherein the least one performance characteristic of the focused energy source comprises an energy intensity of the energy beam.

7. The system of claim 1, wherein the focused energy source comprises a laser welder configured to generate a laser energy beam.

8. The system of claim 1, comprising a sensor configured to detect parameters relating to a brazing process performed via the focused energy source.

9. The system of claim 8, wherein the detected parameters include an ambient temperature, a heat level of the energy beam, or movement of the energy beam.

10. The system of claim 8, wherein the sensor is configured to transmit the detected parameters to the controller to adjust the at least one performance characteristic of the focused energy source.

11. A system, comprising:
    a turbine component comprising a superalloy; and
    a pre-sintered preform (PSP) braze material disposed on a portion of the turbine component and bonded to the turbine component via brazing, wherein the portion of the turbine component not bonded to the PSP braze material is materially unchanged due to the brazing.

12. The system of claim 11, wherein the turbine component comprises a turbine bucket or a turbine nozzle.

13. The system of claim 11, wherein the PSP braze material is disposed in a hole of the turbine component.

14. The system of claim 11, wherein the PSP braze materials are independently heated and solidified via a focused energy beam.

15. The system of claim 11, comprising:
    a focused energy source configured to generate an energy beam for focused brazing of the turbine component and first and second braze materials comprising the PSP braze material; and
    a controller configured to adjust at least one characteristic of the energy beam, wherein the at least one characteristic comprises a focal point of the energy beam or an intensity of the energy beam.

16. The system of claim 15, wherein the focused energy source comprises an electron beam welder or a laser beam welder.

17. A method, comprising:
 generating an energy beam from a focused energy source; and
 directing the energy beam toward a pre-sintered preform of a braze material to seal a hole in a turbine component.

18. The method of claim 17, comprising moving the energy beam in a pattern via one or more beam deflectors.

19. The method of claim 17, comprising raising the temperature of the pre-sintered preform between approximately 200 and 500 degrees Fahrenheit per minute.

20. The method of claim 17, comprising heating the pre-sintered preform to approximately between 2000 and 2275 degrees Fahrenheit for approximately between one and five minutes.

* * * * *